A. HARTH.
ELECTRIC HEATER.
APPLICATION FILED AUG. 29, 1916.
1,242,687.
Patented Oct. 9, 1917.
2 SHEETS—SHEET 1.
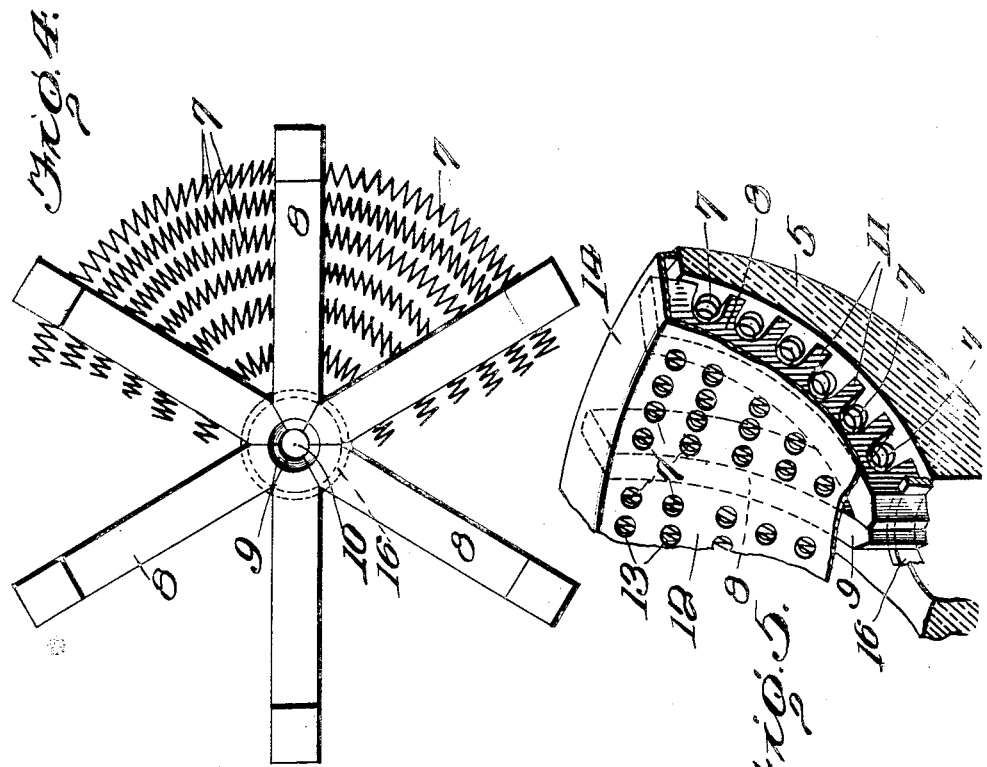
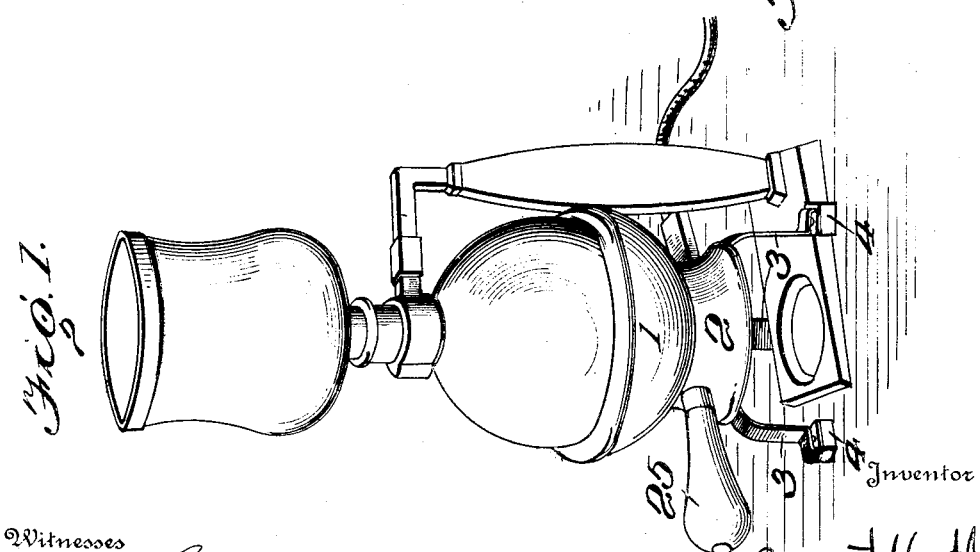

A. HARTH.
ELECTRIC HEATER.
APPLICATION FILED AUG. 29, 1916.
1,242,687.
Patented Oct. 9, 1917.
2 SHEETS—SHEET 2.
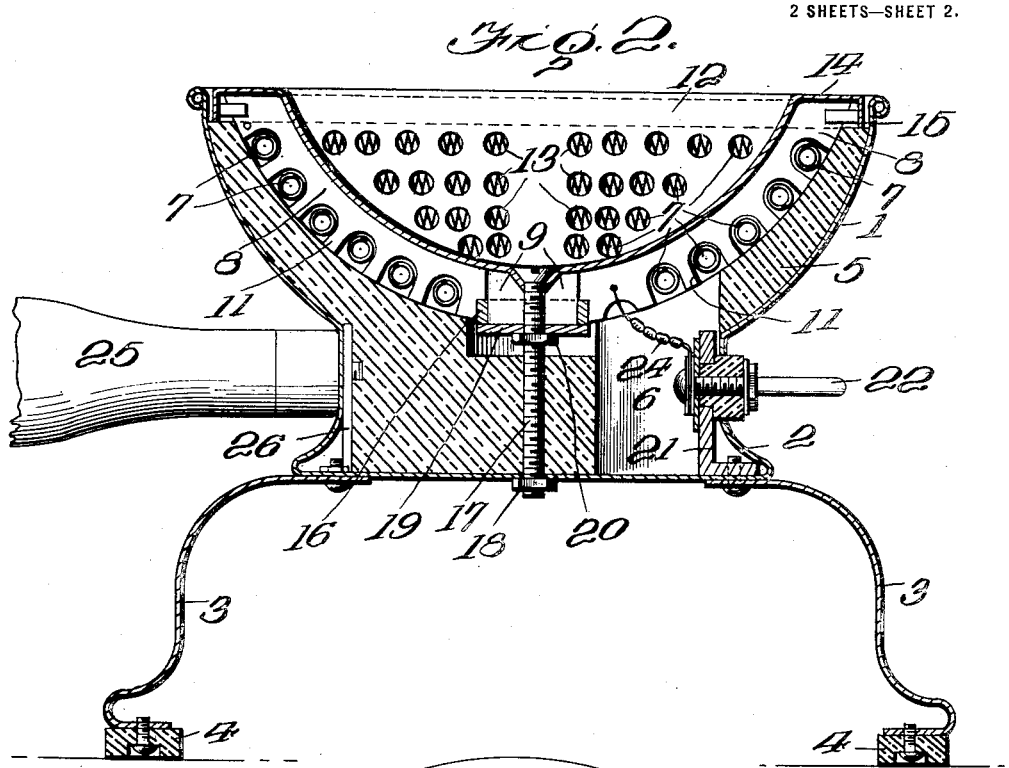
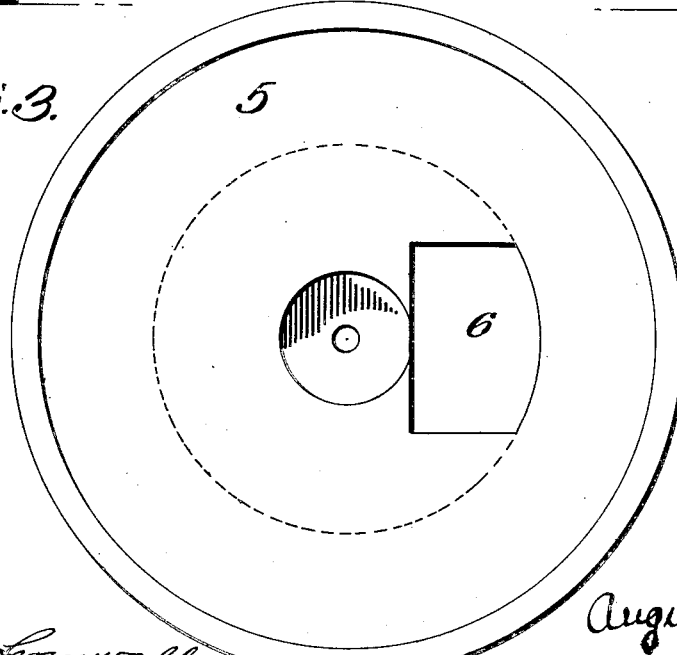
Witnesses
Inventor
August Harth
By
Herbert Peck
Attorney

UNITED STATES PATENT OFFICE.

AUGUST HARTH, OF CHATHAM, NEW JERSEY, ASSIGNOR TO NATIONAL ELECTRIC UTILITIES CORPORATION, OF DANBURY, CONNECTICUT, A CORPORATION OF CONNECTICUT.

ELECTRIC HEATER.

1,242,687.     Specification of Letters Patent.     Patented Oct. 9, 1917.

Application filed August 29, 1916. Serial No. 117,494.

*To all whom it may concern:*

Be it known that I, AUGUST HARTH, a citizen of the United States of America, and resident of Chatham, Morris county, New Jersey, have invented certain new and useful Improvements in and Relating to Electric Heaters, of which the following is a specification.

This invention relates to certain improvements in electric heaters; and the objects and nature of the invention will be readily understood by those skilled in the art in the light of the following explanation of the accompanying drawings illustrating what I now believe to be the preferred embodiment and mechanical expression of the invention from among other forms, constructions and arrangements within the spirit and scope thereof.

An object of the invention is to produce a portable electric heater operative on ordinary electric light circuits, of exceedingly strong, durable and compact construction, and readily applicable to various utensils employed in the house to supply the necessary heat in the preparation of food and beverages and for other purposes.

A further object of the invention is to provide an electric heater that will concentrate the heat generated thereby where it is needed to perform maximum work, to gain maximum efficiency, and to reduce to the minimum loss of heat by radiation, as by concentrating the heat at the bottom and around the sides of a utensil or receptacle to be heated.

With these and other objects in view the invention consists in certain novel features in construction and in combinations and arrangements more fully and particularly set forth hereinafter.

Referring to the accompanying drawings:—

Figure 1, is a prespective of a heater constructed in accordance with my invention and applied to a glass coffee percolator.

Fig. 2, shows the heater in central vertical section.

Figs. 3, 4 and 5, are detail views.

There has been for some time a public demand for an electric heater that can be applied to the well known all-glass coffee percolators of commerce, to take the place of the more or less dangerous alcohol lamps now supplied with said percolators, and that will quickly raise the temperature of the liquid in the percolators to the desired degree with a minimum loss of heat. The common flat disk electric heaters now found on the market are not well adapted for heating such percolators, among other reasons, because such heaters do not concentrate and hold the heat against the liquid bowls of the percolators but permit great loss of heat by radiation into the surrounding atmosphere. The glass liquid containers or bowls of these percolators are rounded or spheroidal in form, and it is obvious that there is great loss of heat when attempt is made to heat the liquid in the bowl by placing an ordinary portable flat heater thereunder in place of the alcohol lamps ordinarily employed for this purpose.

It is the purpose of my invention to provide a portable electric heater, preferably as an individually complete or separate unit or structure, that can be readily applied to the bowl of a glass percolator, or other utensil, and that is approximately of a cup-like, concaved or centrally depressed formation to receive the lower portion of the bowl of a percolator or other utensil and extend up at the exterior thereof and surround the same to concentrate and hold the heat against the bowl and direct the heat inwardly against the sides of the bowl as well as upwardly against the bottom surface thereof.

In the particular example illustrated by the accompanying drawings, I employ a metal bowl 1, having an annular or continuous top beaded edge, and a central depending closed bottom or neck 2, from which supporting legs 3, depend and diverge and to which said legs are fixed at their upper ends. The lower ends of the legs can be provided with feet 4, of insulating material, if so desired.

The interior of this metal bowl is approximately occupied by a thick body 5 of hard non-conducting insulating material. This insulating body 5, is of cup or bowl form with preferably thick heavy walls and a central depending base portion completely filling the depending bottom or neck of the metal bowl, except for a vertical chamber, passage or opening 6, to receive the electrical connections from the exterior of the bowl to the electrical resistance within the insulating cup 5. The upwardly flaring or centrally depressed bell portion of the body 5 conforms to the inner surface of the upwardly flaring portion of the metal bowl 1, and forms a refractory or other insulating material lining or facing therefor.

Within the top depression or concavity of the insulating cap or body 5, I provide a suitable electric heat generating or resistance unit. In the example illustrated, this resistance is composed of one or more electric resistance coils 7, spaced and held in position by a spider-like frame work comprising radiating and upwardly curving similar ribs or arms 8, of suitable insulating or non-conducting material. The lower edges of these ribs fit the top surface of the concavity of the insulating cup 5, and extend from the center thereof approximately to the top edge thereof, and hence the ribs are uniformly spaced apart at their upper ends and converge downwardly and inwardly to the center of the bottom of the concavity, the inner lower ends 9, of the ribs being beveled off at their side faces so that said inner ends meet to form a hub having a center vertical perforation 10. Each rib is longitudinally curved to correspond to the curvature of the concavity of the insulating cup so that the grill or frame formed by the ribs is of a cup or dished form approximately corresponding to the concavity of the insulating cup.

Each rib is formed approximately throughout its length with a longitudinal series of spaced transverse sockets, notches or slots 11, traversing its under edge to receive and hold the electric resistance or resistor 7. This resistor can be composed of a coiled wire or the like, arranged in spiral form with its convolutions traversing all of the ribs and beginning near the hub formed by meeting rib ends 9, and ending near the upper ends of the ribs so that the resistor will approximately line the inner surface of the concavity of the insulating cup from its top edge to its central bottom portion, or else the resistor might be formed of a series of concentric annular or ring-like coils of resistance wire of constantly increasing diameter from the lowest portion of the concavity to the top edge thereof and electrically connected together in any suitable manner to produce the result desired.

The top wall or heating surface of the heater is formed by a sheet metal cup or dished sheet 12, which fits down on the top edges of the ribs 8, and bridges the spaces between the ribs that are traversed by the electrical resistor. This top heating wall 12 is formed with series of perforations 13 usually arranged over the lengths of the resistor 7, so that the heat can radiate directly therefrom through the wall 12.

This sheet metal cup 12, is formed with an annular horizontal or flat top edge portion 14 fitting down on the upper ends of the ribs 8 and closing the upper ends of the spaces between the same, and this edge portion 14 terminates in a depending annular flange 15, fitting down within the top edge of the outside or main bowl 1, and at its lower edge resting on the top edge of the insulating cup 5.

The inner ends of the ribs 8, are tied together to form the center hub by a suitable ring 16, concentric with the center perforation or eye 10, and fitting in slots in the bottom edges of the inner ends 9 of the ribs, and the metal cup 12 and the ribs 8, are clamped together and to the thick insulating cup 5 by a center bolt 17 passing down through cup 12, eye 10, insulating cup 5, and the bottom of the outside bowl 1. This bolt is removable and its head is countersunk in the center of the lowest part of cup 12, while its tightening nut 18 is arranged at the exterior of the bottom of the bowl 1. The tie ring 16, is held in its seat in the ribs by washer 19 and nut 20.

A suitable bracket 21 is secured to the bottom of the bowl 1 and arranged within the passage 6, in the insulating cup.

Contact studs 22 project at the exterior of the neck or bottom of the bowl 1, and extend therethrough and are secured to the bracket 21, from which they are suitably insulated. These studs are also insulated from each other and from the bowl 1, as will be readily understood by those skilled in the art. The studs are connected up electrically with the electric resistor 7, in any suitable manner through insulated electrical connections 24, arranged within the passage 6. The studs 22 are electrically connected with the house electric light circuit, as is well understood by those skilled in the art, to provide the power circuit for generating the desired heat through the medium of the resistor which can be of any suitable material, construction and formation to provide the hot surfaces approximately throughout the full area of the concavity of the insulating cup 5.

I also preferably provide the heater with an exterior handle 25, projecting from the neck or base portion of the bowl 1 and suitably fixed thereto and to the insulating cup 5, through the medium of an anchor 26 embedded therein. This heater is placed under the bowl of the percolator or other utensil, with the bowl fitting down into the metal cup 12, which provides a heating surface of very extensive area surrounding the lower portion of the bowl and confining the heat thereto. The heat is radiated horizontally and inwardly from the upper surrounding portions of the resistor directly against the side of the bowl while the heat is radiated upwardly against the bottom of the bowl from the lower portions of the resistor. The peculiar dished formation of the heater causes the heat to converge and concentrate against the bowl with a minimum loss by radiation to the exterior atmosphere.

The perforated metal cup 12, permits direct radiation of the heat from the resistor to the surface of the bowl and the hard upper surface of the insulating cup 5, also serves to reflect the heat from all directions against the surface of the bowl within the cup 12. This insulating cup 5, also serves to protect the metal bowl 1 from the scorching effect of the heat of the resistor. The temperature of the liquid within the bowl can be quickly and economically raised to the desired degree because the peculiar shape of the heater surrounding the lower portion of the bowl brings the bowl into immediate contact with the radiant heat surrounding it.

The heater can be applied to various sizes and shapes of bowls and other utensils and I do not wish to limit my invention to its application to the glass bowls of percolators.

It is evident that various modifications, variations and departures might be resorted to without departing from the spirit and scope of my invention and hence I do not wish to limit myself to the exact disclosures hereof but consider myself entitled to all such changes as fall within the spirit and scope of my invention.

Desiring to protect my invention in the broadest manner legally possible, what I claim is:

1. An electric heater comprising a cup having a heat radiating and electric insulating inner surface, a heat-generating electric resistor of general cup-like formation located in said cup and arranged and exposed over said surface, and a reticulated cup-like wall in said cup and arranged over said resistor so that the heat from the exposed resistor can radiate directly through the openings in said wall to the surface of a percolator or other bowl to be heated depending into said cup-like wall.

2. An electric heater having a cup-like cavity to receive the bowl of the utensil to be heated, an electric heat generating resistor within and conforming to said cavity, and an insulating framework maintaining said resistor in cup-like formation over the surface of said cavity.

3. An electric heater comprising a supporting body having a cup-like depression with a heat reflecting insulating material surface, an electric resistor within said depression and of approximately corresponding cup-like formation and having its exposed heat radiating surfaces arranged over said insulating material surface, insulating securing and guarding means for said resistor exposing the heat radiating surfaces thereof, and an open-work cup-like guard wall over and spaced from said insulating surface and from said exposed resistor, whereby the heat radiates directly from the exposed surfaces of the resistor to a utensil bowl depending into said guard wall.

4. An electric heater comprising a supporting cup having a heat radiating insulating material inner surface, and a coiled-wire resistor of general cup-like formation arranged in convolutions over said surface and having its metal heat radiating surfaces exposed, said heater being provided with insulating means to support and maintain the spacing of said convolutions with the radiating surfaces thereof exposed, substantially as described.

5. An electric heater comprising a heat generating electric resistor of general cup-like formation to receive and surround the lower end of the bowl of the utensil to be heated, and supporting and holding means for said resistor embodying a spider-like insulating framework, substantially as described.

6. An electric heater comprising an exterior metal bowl providing a support, an insulating material cup within said bowl, an electric resistor of general cup-like form within the concavity of said cup, a cup-like frame holding said resistor within said concavity, and a metal cup over said frame to receive the bowl of the utensil to be heated.

7. An electric heater comprising a body of insulating material, a series of insulating material ribs arranged thereon and having sockets at their lower edges, and a heat generating electric resistor traversing said sockets and arranged between said ribs and said body.

8. An electric heater of cup-like formation to removably receive and extend up around the depending bowl of a glass percolator and to radiate and reflect heat upwardly and inwardly directly against said bowl and confine the same thereto, said heater comprising a support having a cup-like body of insulating and heat radiating material, and an electric resistor having exposed heat radiating surfaces, said resistor arranged within and generally conforming to the concavity of said body and having its heat radiating surfaces exposed over and approximately distributed throughout the inner surface of said body, whereby heat will be reflected from said inner insulated surface and radiated from said resistor surfaces directly against said bowl.

9. An electric heater comprising a cup-like body embodying non-conducting material forming the surface of the concavity of the cup, a series of insulating material radiating ribs longitudinally curved to conform to the surface of the concavity and meeting and secured together at their inner ends at the floor of the concavity, and a heat generating electric resistor distributed approximately throughout said non-conducting surface and arranged between said surface and said ribs and held in position by said ribs, substantially as described.

10. An electric heater comprising a cup-like body embodying non-conducting material forming the surface of the concavity of the body, radiating ribs extending along said surface from the center thereof to the upper portion thereof and conforming thereto, a heat generating electric resistor distributed approximately throughout the surface of said concavity and held in position by and fitting said ribs, a perforated metal cup arranged within said concavity and fitting down on said ribs, and center securing means clamping said cup and ribs together and securing said ribs down on said surface, substantially as described.

11. An electric heater comprising an exterior supporting bowl, an insulating material surface for the concavity of said bowl, an electric resistor of general cup-like form within the concavity of said bowl, and an insulating-material open-frame holding said resistor within said concavity and maintaining the conformation thereof.

12. An electric heater comprising a supporting body having a concavity to receive the utensil bowl to be heated, and a heat-generating electric resistor embodying convolutions approximately lining and exposed within said concavity and provided with a convolution-holding and positioning frame of insulating material fitted down in said concavity and approximately conforming to the surface thereof.

13. An electric heater comprising an insulating body having a concavity to receive the utensil bowl to be heated, heat generating electric resistor plies approximately lining said concavity and exposed over the surface thereof, and a wall conforming to said concavity and spaced from the surface thereof and from said resistor plies and having openings opposite said plies for the direct radiation of heat from said exposed plies to said bowl to be heated.

14. An electric heater comprising an insulating body having a concavity to receive the utensil bowl to be heated, heat generating electric resistor plies within said concavity and distributed and exposed at the exterior of the inner surface thereof to directly radiate heat against the bottom and sides of said bowl, and an annular top edge wall for said concavity overhanging the top of the space within the concavity occupied by said resistor plies to confine the heat therein and against the surface of said bowl.

15. An electric heater comprising an insulating body having a concavity to receive the utensil bowl to be heated, an exterior wall within the concavity and spaced from the inner surface thereof, and heat generating electric resistor plies exposed and distributed within said space below and around said wall, the annular top of said space being closed, said wall being formed for the direct radiation of heat from said exposed plies therethrough to said bowl.

16. An electric heater comprising an insulating body, insulating ribs arranged on said body and approximately meeting at and radiating from their inner ends, heat generating electric resistor plies distributed over the surface of the body and held and positioned by said ribs, an outer wall fitting over said ribs, and means securing said ribs at their inner ends to said body.

17. An electric heater comprising a body, insulating ribs arranged on the surface of said body and meeting at and radiating from their inner ends, heat generating electric resistor plies traversing said ribs and held and positioned thereby, and means interlocking with the inner ends of said ribs and holding them together and positioned and clamping them to said body, substantially as described.

18. An electric heater comprising an insulating bowl, insulating ribs arranged longitudinally within the bowl and approximately conforming to the inner surface thereof and converging on the floor thereof, a ring interlocking with the inner ends thereof, heat generating electric resistor plies traversing and held positioned within the concavity by said ribs, and a vertical screw clamping said ring to said ribs and securing the same to said bowl.

19. An electric heater comprising an insulating bowl, an open-work frame in and conforming to said bowl, heat generating electric resistor plies held and positioned by said frame, an outer wall in said bowl and resting on said frame, and a center screw having means clamping said outer wall and frame together and securing the same to the bowl.

20. An electric heater comprising a bowl having a depending neck, insulating material forming the inner surface of the bowl and entering said neck, heat generating electric resistor plies within the bowl and distributed over the insulated surface thereof, securing and positioning means for said plies, an outer wall for the concavity of said bowl, means for securing said wall to the bottom of the bowl, said insulating material having a vertical passage from the concavity of the bowl into said neck and electrical connections from the exterior of the neck and through the passage to said resistor.

21. As a new article of manufacture, a portable electric heater for and formed to removably fit the lower end of and extend up around the depending bowl of a glass percolator or other utensil, said heater comprising a metal bowl, a comparatively thick bowl-like body of heat radiating refractory material therein, an electric resistor in the concavity of said body of general cup-like formation, and means for guarding and maintaining the cup-like conformation of the resistor.

22. An electric heater comprising a body, insulating material bars having coiled-wire-retaining edge recesses, a coiled wire electric resistor fitting said recesses, said bars maintaining the position of and guarding said resistor and exposing the same for the direct radiation of heat, and means confining said bars in position.

23. An electric heater comprising a thick hard refractory material body having a top depression forming the body of cup shape, an electric resistor of cup-like conformation arranged in said depression and having its heating surfaces exposed to directly radiate heat against a utensil bowl depending in said depression or against an object arranged over said depression, and supporting means.

24. An electric heater comprising an insulating body having a concavity approximately conforming to the depending utensil bowl to be heated, heat generating electric resistor plies approximately lining said concavity at the bottom and upwardly extending surface thereof and exposed to directly radiate heat against the bottom and sides of the bowl and upwardly and inwardly in the concavity, and means within the concavity guarding said resistor plies.

25. An electric heater comprising a heat radiating refractory material body, a support therefor, heat generating electric resistor plies arranged and exposed over the surface of said body, and insulating material bars arranged over said body and having recesses in their edges adjacent to said surface of the body, said recesses receiving said plies and maintaining them properly positioned with their surfaces exposed for the direct radiation of heat.

26. An electric heater comprising a refractory material body, a heat generating electric resistor arranged in spaced convolutions over the surface of said body, an open-work insulating material frame carrying said resistor and maintaining the conformation and spacing of said convolutions, and means clamping said frame to said body and maintaining the position thereof.

27. An electric heater comprising a refractory material body, a heat generating electric resistor arranged and exposed over the surface of said body in the form of convolutions, an open-work insulating material frame fitted over said surface of the body and carrying said resistor and positioning the convolutions thereof, an open-work wall resting on said frame and insulated from said resistor, and means holding said wall to the frame and the frame to said body.

28. An electric heater comprising a bowl-like body having the surface of its concavity formed of heat radiating and insulating material, an electric heat generating resistor generally conforming to and arranged over the surface of said concavity, and a cup-like wall arranged over and spaced from said resistor and formed with a multiplicity of openings for the direct radiation of heat from the resistor and from said surface into the space within the concavity of said wall or against the surface of a bowl depending in said wall, the heat radiating surfaces of said resistor being exposed between said surface and said wall and behind said openings.

AUGUST HARTH.